(12) United States Patent
Schilling et al.

(10) Patent No.: US 8,955,317 B2
(45) Date of Patent: Feb. 17, 2015

(54) INTERNAL COMBUSTION ENGINE AND ASSOCIATED OPERATING METHOD

(71) Applicant: Daimler AG, Stuttgart (DE)

(72) Inventors: Markus Schilling, Stuttgart (DE); Frank Otto, Esslingen (DE); Klaus Roessler, Stuttgart (DE)

(73) Assignee: Daimler AG, Stuttgart (DE)

( * ) Notice: Subject to any disclaimer, the term of this patent is extended or adjusted under 35 U.S.C. 154(b) by 3 days.

(21) Appl. No.: 13/716,165

(22) Filed: Dec. 16, 2012

(65) Prior Publication Data

US 2013/0104544 A1 May 2, 2013

Related U.S. Application Data

(63) Continuation-in-part of application No. PCT/EP2011/002884, filed on Jun. 11, 2011.

(30) Foreign Application Priority Data

Jul. 31, 2010 (DE) .......................... 10 2010 033 005

(51) Int. Cl.
*F02B 33/44* (2006.01)
*F02M 25/07* (2006.01)
(Continued)

(52) U.S. Cl.
CPC .......... *F02M 25/0706* (2013.01); *F02B 17/005* (2013.01); *F02D 13/0226* (2013.01); *F02D 13/0246* (2013.01); *F02D 13/0261* (2013.01); *F02D 41/005* (2013.01); *F02D 41/006* (2013.01); *F02D 41/0065* (2013.01); *F02M 25/0709* (2013.01); *F02M 25/0752* (2013.01); *F02B 2275/32* (2013.01); *F02M 25/0727* (2013.01); *Y02T 10/142* (2013.01); *Y02T 10/47* (2013.01); *Y02T 10/18* (2013.01)
USPC ................. 60/605.2; 123/568.14; 123/568.11

(58) Field of Classification Search
CPC . F02D 41/0065; F02D 41/006; F02D 41/005; F02D 13/0226; F02D 13/0246; F02D 13/0261; F02M 25/0709; F02M 25/0752; F02M 25/0706; Y02T 10/18; Y02T 10/47
USPC ......... 60/605.2; 123/568.11, 568.14; 701/108
See application file for complete search history.

(56) References Cited

U.S. PATENT DOCUMENTS 7,089,913 B2 * 8/2006 Yamaoka et al. ........ 123/568.14
7,207,311 B2 * 4/2007 Chmela et al. ........... 123/568.14
(Continued)

FOREIGN PATENT DOCUMENTS

DE 10 2009 034 763 2/2010
DE 10 2008 053 243 4/2010
(Continued)

*Primary Examiner* — Thai Ba Trieu
*Assistant Examiner* — Ngoc T Nguyen
(74) *Attorney, Agent, or Firm* — Klaus J. Bach

(57) ABSTRACT

In a method for operating a supercharged internal combustion engine of a motor vehicle, at the same time an internal exhaust gas recirculation and an external exhaust gas recirculation are carried out in an engine operating range with lean burn operation modes, wherein the exhaust gas recirculation rate of the internal and the external exhaust gas recirculation is increased with increasing load and/or speed of the internal combustion engine in the lean engine operating range and, at high engine speeds and loads, a homogenous mixture operation is carried out. The invention also reside in an internal combustion engine for performing the method.

4 Claims, 3 Drawing Sheets

(51) Int. Cl.
*F02B 17/00* (2006.01)
*F02D 13/02* (2006.01)
*F02D 41/00* (2006.01)

(56) References Cited

U.S. PATENT DOCUMENTS 7,415,963 B2 * 8/2008 Chmela et al. ............ 123/568.21
7,934,486 B1 * 5/2011 Styles et al. ............. 123/568.12

2009/0248271 A1    10/2009   Kuzuyama et al.

FOREIGN PATENT DOCUMENTS

| | | |
|---|---|---|
| DE | 10 2009 018 735 | 10/2010 |
| JP | 2007 198135 | 8/2007 |
| JP | 2007 315230 | 12/2007 |
| JP | 2008 255 866 | 10/2008 |
| JP | 2010 07620 | 1/2010 |
| WO | WO 2007/136142 | 11/2007 |

* cited by examiner

INTERNAL COMBUSTION ENGINE AND ASSOCIATED OPERATING METHOD

This is a Continuation-In-Part application of pending international patent application PCT/EP2011/002,884 filed Jun. 11, 2011 and claiming the priority of German application 10 2010 033 005.1 filed Jul. 31, 2010.

BACKGROUND OF THE INVENTION

The present invention relates to a method for operating a supercharged internal combustion engine, in particular of a motor vehicle. The invention furthermore relates to a supercharged internal combustion engine, in particular of a motor vehicle.

Exhaust gas recirculation, EGR for short, is generally known for reducing pollutant emissions and/or for reducing fuel consumption. An exhaust gas recirculation rate, EGR rate for short, here describes the proportion of the recirculated exhaust gas relative to the fresh air supplied to the combustion chambers of the internal combustion engine, the mixture of recirculated exhaust gas and supplied fresh air then forming the fresh gas or the fresh charge in the respective combustion chamber. The EGR rate in such case varies usually dependent on the load and/or speed of the internal combustion engine. In particular, when the engine is idling, or under partial load, a higher EGR rate is set than for example during full load operation.

In the case of exhaust gas recirculation, a distinction is made between external exhaust gas recirculation and internal exhaust gas recirculation. With conventional external EGR, exhaust gas is branched off from an exhaust system outside the internal combustion engine and is supplied to a fresh air system outside the internal combustion engine. The EGR thus takes place outside the internal combustion engine and to this extent externally. In contrast to this, the internal EGR takes place in the interior of the internal combustion engine. For example, after a working stroke of the respective piston of the internal combustion engine, which as a rule is configured as a piston engine, exhaust gas may remain in the respective cylinder, for example due to a certain dead volume in the cylinder at the top dead center of the piston. The proportion of exhaust remaining in the cylinder can be varied by corresponding valve closure times of the gas exchange valves. If for example the exhaust valve closes earlier than usual when the intake valve is closed, the proportion of exhaust remaining in the cylinder increases. In this case, what is called intermediate compression occurs. Further, it is possible to open the respective intake valve prematurely, i.e. earlier than usual, so that exhaust is displaced out of the respective cylinder in the direction of the fresh air system. This exhaust is drawn back in again during the following intake stroke, and thereby increases the proportion of exhaust in the fresh gas. Additionally or alternatively, it is likewise possible to close the exhaust valve with a delay, i.e. later than usual, so that exhaust gas already expelled from the cylinder can be drawn back out of the exhaust system or out of the region of the internal combustion engine which is associated with the exhaust system again during the next intake stroke. The above mentioned measures provide for an internal EGR which can be carried out alternatively or cumulatively in any combination whatsoever.

A method for operating an internal combustion engine is known from DE 10 2008 053 243 in which during a stratified charge operation the exhaust valves in the charge cycle close before a top dead center and the intake valves open after a top dead centre. This means that in the charge cycle operation exhaust gas is retained in the combustion chamber and is utilized in the stratified charge operation. This is an example of internal EGR with intermediate compression, in which exhaust gas is retained in the respective combustion chamber.

A method for operating an internal combustion engine with internal exhaust gas recirculation is known from DE 10 2009 034 763. In this case, an intake valve is opened a second time in order to force out part of the exhaust gas into the fresh gas duct during the exhaust cycle and to draw it back into the combustion chamber during an intake cycle and/or to draw exhaust gas forced out into the exhaust duct back into the combustion chamber by a second opening and closing of the exhaust valve during an intake cycle. This is an example of an internal EGR with back-suction from the fresh air side or from the exhaust side with the aid of an additional opening operation of the respective intake valve or of the respective exhaust valve.

Furthermore—as explained above—in principle it is also possible to shift the moment of closure of the respective exhaust valve and/or the moment of opening of the respective intake valve during the exhaust cycle such that early opening of the respective intake valve or late closing of the respective exhaust valve and hence the possibility of back-suction of the exhaust gas from the fresh air side or from the exhaust side is achieved.

The advantages of internal exhaust gas recirculation are considerably lesser space requirements compared with external exhaust gas recirculation. However, the cost in terms of apparatus for adjusting the EGR rate for internal EGR is considerably greater than for external EGR. Furthermore, internal EGR still has the property in principle that internally recirculated exhaust gas is at a considerably higher temperature than externally recirculated exhaust gas, since with external EGR cooling of the recirculated exhaust gas regularly takes place owing to the length of pipe, and partially also by means of an exhaust gas recirculation cooler, EGR cooler for short. This is a decisive advantage with low and medium loads, since mixture formation and ignition are supported thereby, and thus the residual exhaust gas compatibility is increased. However, with higher loads the knocking tendency increases.

Further, it has proved problematic with internal EGR that the technical devices for constituting the internal EGR (for example, a special cam form in the context of variability of the valve gear) cannot be adapted optimally to each operating point, but rather have to represent a compromise which takes account of the entire map. The result of this may be that the maximum EGR compatibility cannot be optimally exhausted at all operating points. Modern internal combustion engines are operated homogeneously lean (lambda >1) up to into the middle load and speed range, and stoichiometrically (lambda=1) in the upper load range up to full load. In the lean operating range or alternatively lean range, what is called "stratified charge operation" is used as the combustion process in the combustion chambers, in which operation a non-homogeneous distribution of the air/fuel ratio is produced in the charge of the respective combustion chamber directly before the combustion operation in the respective combustion chamber, in particular in conjunction with direct injection of the fuel. In particular, in this case provision is made, for spark-ignition internal combustion engines, to set a larger lambda value in the core region of the respective ignition means, which value decreases with increasing distance from this core region. In this respect, spatial layers with different lambda values are produced in the respective combustion chamber. For example, a rich mixture may be present in the core region, whereas a lean mixture predominates in a middle region surrounding the core region. A further, marginal, region which surrounds the middle region may even be configured to be free of fuel. In a transitional region of the lean range, between stratified and homogeneous operation, the internal combustion engine may continue to be operated lean in a homogeneous/lean operation or homogeneous/stratified operation. In homogeneous/lean operation, the internal combustion engine is operated with a homogeneous lean mixture, the homogeneous mixture being able to be ignited with the ignition means. In homogeneous/stratified operation, the combustion chambers are filled with a homogeneous lean mixture, the lean mixture present being ignited by means of a readily flammable, richer stratified charge at the respective ignition means. In particular, in the lean range with such stratified charge operation, homogeneous/lean operation and homogeneous/stratified operation, an optimally set EGR rate matters, for example in order to avoid overheating of the combustion process, which would result in increased nitrogen oxide emissions.

Such lean burn operation modes are suitable in particular for idling operation or for partial load operating conditions of the internal combustion engine. In the upper load range and full load range, the internal combustion engine is operated stoichiometrically homogeneously (lambda=1), it being possible here also to provide a cooled external EGR in order to avoid knocking. Advantageously, with the cooled external EGR the temperature in the combustion chamber can be lowered and components of the internal combustion engine can be protected from overheating, so that it is possible to dispense with enrichment of the mixture in order to control the temperature in the combustion chamber, which yields advantages in terms of fuel consumption and of emissions.

It is the object of the present invention to provide an improved operating method of the type referred to hereinbefore or for an associated internal combustion engine, which method is distinguished in particular in that the EGR rate and the temperature of a fresh charge can be adapted better to the respective operating point of the internal combustion engine.

SUMMARY OF THE INVENTION

In a method for operating a supercharged internal combustion engine of a motor vehicle, at the same time an internal exhaust gas recirculation and an external exhaust gas recirculation are carried out in an engine operating range with lean burn operation modes, wherein the exhaust gas recirculation rate of the internal and the external exhaust gas recirculation is increased with increasing load and/or speed of the internal combustion engine in the lean engine operating range and, at high engine speeds and loads, a homogenous mixture operation is carried out. The invention also reside in an internal combustion engine for performing the method.

DESCRIPTION OF PARTICULAR
EMBODIMENTS OF THE INVENTION

The invention is based on the general concept of carrying out at the same time an internal EGR and an external EGR, at least in an engine operating range with lean burn operating modes, with an EGR rate of the external EGR being increased with increasing load and/or speed of the internal combustion engine in the lean operating range. As a result of the increase in the external EGR rate, the proportion of exhaust gas in the fresh gas supplied to the respective combustion chamber becomes greater, which automatically correspondingly proportionally reduces the proportion of exhaust gas in the respective combustion chamber which can be achieved by means of the internal EGR. Because of the good controllability of the external EGR, the EGR rate can be adapted better to the different operating points of the internal combustion engine.

Particularly advantageous in this case is an embodiment in which at the same time an EGR rate of the internal EGR is reduced with increasing load and/or speed in the lean operating range. The internal EGR rate can be changed by appropriate measures, for example by changing the valve timings of gas exchange valves. A reduction in the internal EGR rate with increasing load and/or speed improves the adaptability of the EGR to varying operating points of the internal combustion engine.

Particularly advantageous in this case is an embodiment in which an overall EGR rate which is formed by the total of the external EGR rate and internal EGR rate is reduced with increasing load and/or speed in the lean engine operating range.

Thus an embodiment in which, with increasing load and/or speed of the engine, the internal EGR rate is reduced to a greater extent than the external EGR rate is increased, so that a desired reduction in overall EGR rate is obtained, which is particularly advantageous.

Furthermore, provision may be made for the external EGR rate to be smaller than the internal EGR rate over the entire load and/or speed range of the lean engine operating range.

According to another embodiment, the lean engine operating range can be established only within a predetermined range of load and/or speed, whereas at higher loads and/or speeds a homogeneous operation can be performed without or with some EGR.

The external EGR rate may for example be set actively by means of an EGR valve. This yields comparatively precise adjustability at comparatively low cost. For example, the external EGR can be carried out via a low pressure exhaust gas recirculation line, LP EGR line for short, which fluidically connects an exhaust system of the internal combustion engine downstream from a turbine of an exhaust turbocharger to a fresh air system of the internal combustion engine upstream from a compressor of the exhaust turbocharger.

The internal EGR rate may for example be set passively by the dynamics of the gas exchange operations and/or actively. The dynamics of the gas exchange operations are determined by the available time windows and the pressures prevailing in each case, which depend on the operating states of the internal combustion engine and thereby have an effect on the internal EGR. Active adjustment of the internal EGR can be carried out e.g. by early opening of at least one intake valve of a respective cylinder of the internal combustion engine and/or by late closing of at least one exhaust valve of the respective cylinder.

In particular, the internal EGR can be effected in that a valve stroke/crankshaft angle curve of the respective early opening intake valve and/or of the respective late closing exhaust valve has at least four points of inflection. In particular, in this case provision may be made to reduce a valve stroke of the respective valve in the region of a top dead center position of the piston relative to the maximum of the valve stroke. Additionally or alternatively, a valve stroke/crankshaft angle curve of the early opening intake valve and/or of the late closing exhaust valve may have a plateau. Alternatively, the valve stroke/crankshaft angle curve of the early opening intake valve and/or of the late closing exhaust valve may have a minimum located between two maxima.

A supercharged internal combustion engine in which the operating method presented here can be established comprises an exhaust system for removing exhaust from cylinders of the internal combustion engine, a fresh air system for supplying fresh air to the cylinders, an exhaust gas turbocharger, the turbine of which is arranged in the exhaust system and the compressor of which is arranged in the fresh air system, an LP EGR line for fluidically connecting the exhaust system downstream from the turbine to the fresh air system upstream of the compressor, gas exchange valves for controlling gas exchange operations of the cylinders and a valve drive for actuating the gas exchange valves. In order to effect the internal EGR, the valve drive in this case is configured such that at least in the lean range, it permits internal EGR by early opening of at least one intake valve of the respective cylinder and/or by late closing of at least one exhaust valve of the respective cylinder. Thus the supercharged internal combustion engine presented here combines an adjustable external EGR with an adjustable internal EGR.

Preferably an EGR valve is provided for controlling the LP EGR line, in order to be able to set the external EGR rate.

Furthermore, a control means for operating the internal combustion engine may be provided, which means is configured and/or programmed such that the operating method according to the invention which is described above can be carried out therewith.

Corresponding to a particularly advantageous embodiment, the valve drive may be equipped with a camshaft having a plurality of cams which control the exhaust valves and the intake valves, a cam profile of a respective cam being formed such that a valve stroke/crankshaft angle curve of a late closing exhaust valve and/or of an early opening intake valve has at least four points of inflection.

The valve drive may in particular be configured to be adjustable, in order to be able to shift the closure times of the gas exchange valves in order to change the internal EGR rate.

Further features and advantages of the invention will become more readily apparent from the following description with reference to the accompanying drawings.

DESCRIPTION OF ADVANTAGEOUS
EMBODIMENTS OF THE INVENTION

Figure 1:
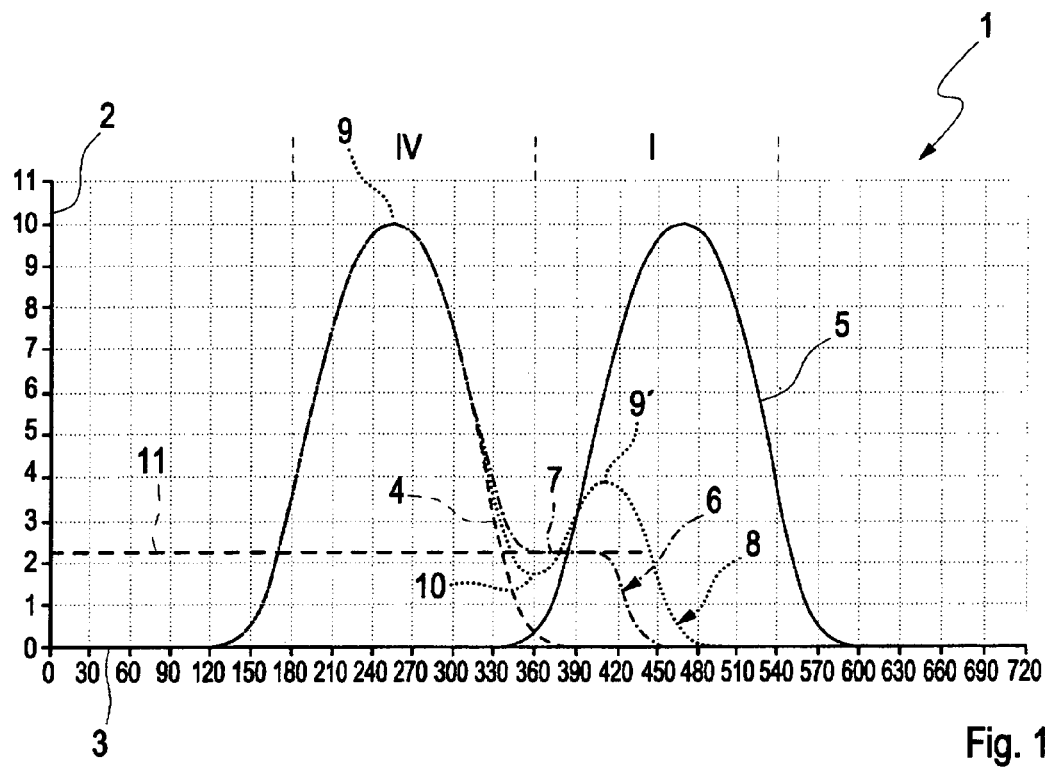
FIG. 1 shows a valve stroke/crankshaft angle curve of an exhaust valve with late closing of the exhaust valve.

As shown in FIG. 1, internal EGR can be effected by late closing of an exhaust valve. In order to clarify this variant of internal EGR, in a graph 1 the valve stroke of the respective valve is plotted on the ordinate or y-axis 2, whereas the crankshaft angle is plotted on the abscissa or x-axis 3. Between a crankshaft angle of 180° to 360°, substantially an exhaust cycle IV takes place, whereas between a crankshaft angle of 360° to 540° an intake cycle I takes place. Furthermore, a valve stroke/crankshaft angle curve 4 of the exhaust valve in accordance with a standard cam profile is shown in the graph 1. Further, there can be seen in the graph 1 a valve stroke/crankshaft angle curve 5 of an intake valve in accordance with a standard cam profile, and a valve stroke/crankshaft angle curve 6 of the exhaust valve with a plateau 7, and a valve stroke/crankshaft angle curve 8 of the exhaust valve with a minimum 10 located between two maxima 9, 9'. In the case of the valve stroke/crankshaft angle curves 6, 8 of the exhaust valve, which have either a plateau 7 or a minimum 10 located between two maxima 9, 9', these valve stroke/crankshaft angle curves 6, 8, compared with the valve stroke/crankshaft angle curves 4, 5 which are provided with two points of inflection, are provided with two additional points of inflection, and thus with four points of inflection. An exhaust valve which has such a valve stroke/crankshaft angle curve 6, 8 is not continuously closed in accordance with a valve stroke/crankshaft angle curve 4 of the conventional exhaust valve, but in the case of the valve stroke/crankshaft angle curve 8 after initial closing is reversed somewhat, which results in the minimum 10 between the two maxima 9, 9' in the valve stroke/crankshaft angle curve 8. In the case of the valve stroke/crankshaft angle curve 6, the plateau 7 of the valve stroke/crankshaft angle curve 6 of the exhaust valve is produced by holding the partially closed exhaust valve at a predetermined valve stroke level 11.

Both variants of the valve stroke/crankshaft angle curves 6, 8 of the exhaust valve, compared with the conventional valve stroke/crankshaft angle curve 4 of the exhaust valve, result in a late closing of the exhaust valve, which here effects a form of internal EGR, namely by back-suction of exhaust out of the exhaust system.

Figure 2:
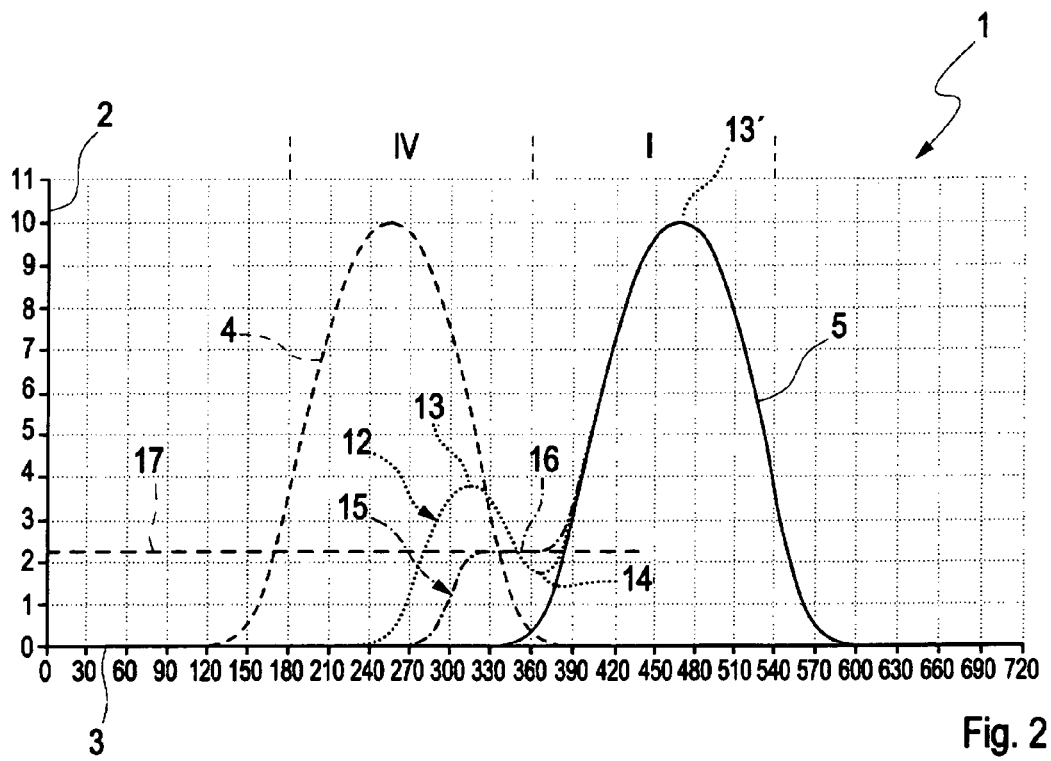
FIG. 2 shows a valve stroke/crankshaft angle curve of an intake valve with early opening of the intake valve.

Another form of internal EGR is illustrated in FIG. 2. In addition to the conventional valve stroke/crankshaft angle curves 4, 5 of the exhaust valve or of the intake valve in accordance with a standard cam profile, an additional valve stroke/crankshaft angle curve 12 of the intake valve with a minimum 14 located between two maxima 13, 13', and also a valve stroke/crankshaft angle curve 15 of the intake valve with a plateau 16 are shown. In this case, during the opening of the intake valve in the case of the valve stroke/crankshaft angle curve 12 the opening movement of the intake valve is interrupted by partial closing of the intake valve, so that the minimum 14 located between the two maxima 13, 13' occurs in the course of the valve stroke/crankshaft angle curve 12. In the case of the valve stroke/crankshaft angle curve 15, the partially opened intake valve is held at a predetermined valve stroke level 17, so that the plateau 16 occurs in the course of the valve stroke/crankshaft angle curve 15.

Both variants with regard to the valve stroke/crankshaft angle curve 12, 15 of the intake valve result in early opening of the intake valve, which here provides for another form of internal EGR, namely expelling exhaust into the fresh air supply system, which with the next intake cycle I draws in the expelled exhaust gas together with the fresh air.

The two methods for internal EGR explained in FIGS. 1 and 2 may also be combined with each other. In particular, these methods can be effected for carrying out the internal EGR by corresponding cam profiles of cams of a camshaft which are associated with the intake and exhaust valves.

Figure 3:
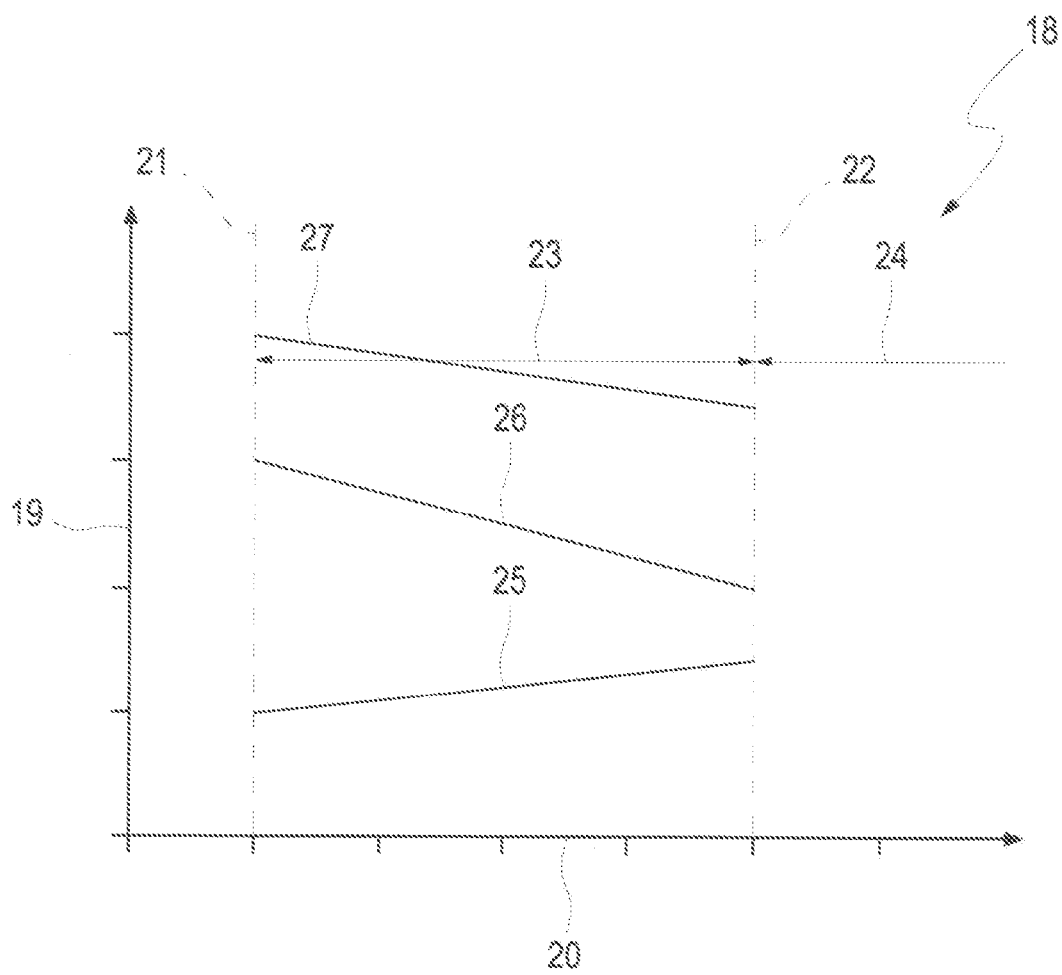
FIG. 3 shows an EGR rate/load curve for an internal EGR and an external EGR.

Referring to FIG. 3, in a graph 18 the EGR rate is plotted on the ordinate or y-axis 19, whereas a load of an internal combustion engine is plotted on the abscissa or x-axis 20. A speed of the internal combustion engine may also be plotted instead of the load. Likewise, a comparison variable which correlates with the load and/or with the speed of the internal combustion engine may be plotted on the abscissa 20.

In the graph 18 there are vertical boundary lines 21 and 22 which define a lower limit 21 and an upper limit 22 for a load range 23 or speed range 23 in which lean burn operation modes such as stratified charge operation, homogeneous/lean operation or homogeneous/stratified operation are to be carried out. The upper limit 22 of the range 23 at the same time forms a lower limit for a range 24 in which homogeneous operation is to take place. Since the lean burn operation modes take place within the range 23, the lean range with its lean burn operation modes will also be designated 23 below. Something similar also applies to the range with homogeneous operation, which will therefore also be designated 24 below.

An exhaust gas recirculation is to be carried out at least in the lean range 23. A curve 25 in this case represents an external EGR. A curve 26 represents an internal EGR. Further, a curve 27 is plotted which represents the overall EGR, i.e. the total of internal EGR 26 and external EGR 25. The curves 25, 26, 27 in this case indicate in each case the gradient of the EGR rate dependent on the load or speed of the internal combustion engine. Below, therefore, the curves 25, 26, 27 are equated with the associated EGR rates, so that the external EGR rate is designated 25, the internal EGR rate 26 and the overall EGR rate 27.

Recognizably, the external EGR rate 25 increases with increasing load and/or with increasing speed. Furthermore, the internal EGR 26 decreases with increasing load or with increasing speed. In this case, provision is made here for the decrease in the internal EGR 26 to be greater than the increase in the external EGR 25, so that the overall EGR rate 27 also decreases with increasing load and/or speed. In the example, the EGR rates 25, 26, 27 change linearly; likewise, other proportionalities may be provided.

Figure 4:
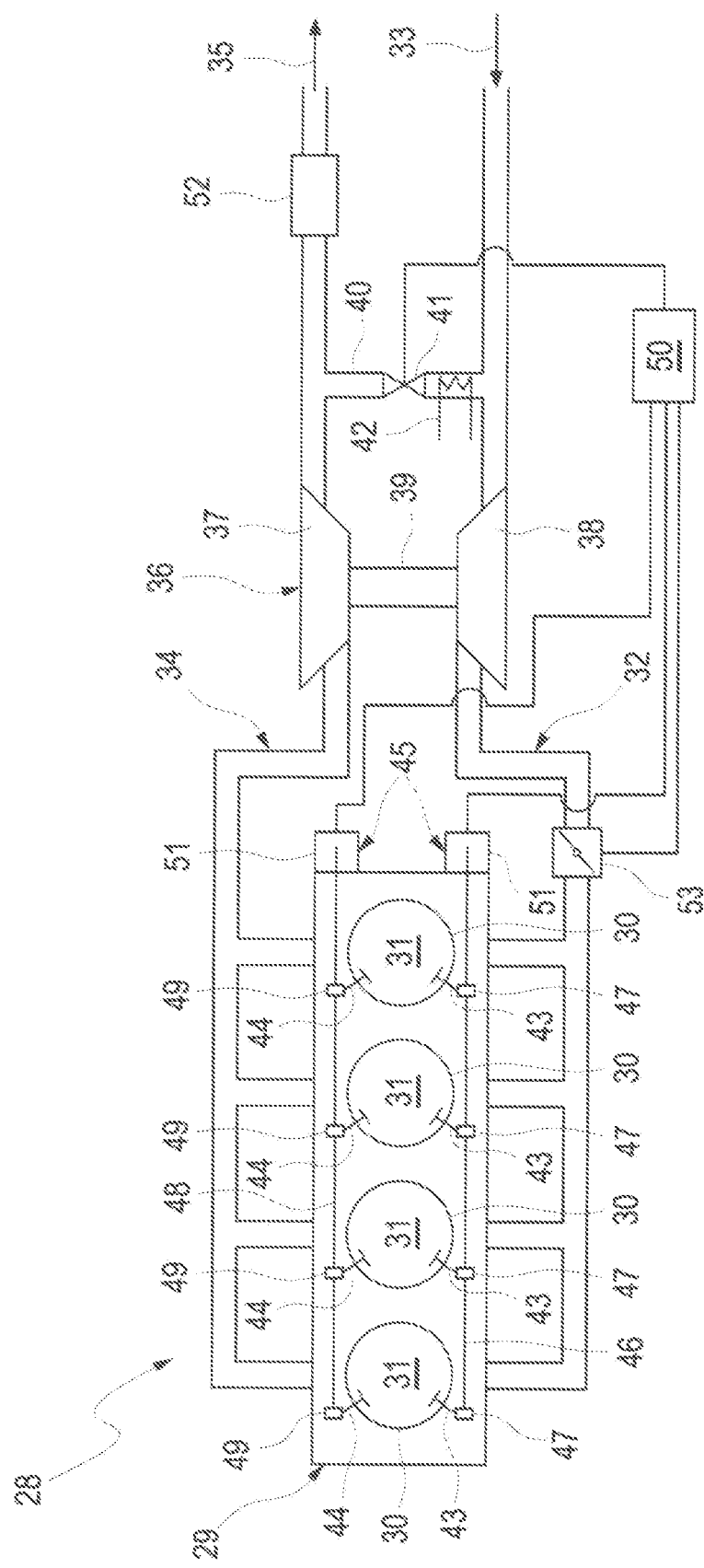
FIG. 4 shows in a basic schematic representation a supercharged internal combustion engine.

According to FIG. 4, an internal combustion engine 28 comprises an engine block 29 with a plurality of cylinders 30 which each comprise a combustion chamber 31 and a piston, not shown here, which is of adjustable stroke within the cylinder. To this extent, the internal combustion engine 28 is a piston engine. The internal combustion engine 28 furthermore comprises a fresh air system 32 with which fresh air 33 which is indicated by an arrow can be supplied to the cylinders 30. Further, the internal combustion engine 28 comprises an exhaust system 34 with the aid of which exhaust 35 which is indicated by an arrow can be removed from the cylinders 30. The internal combustion engine 28 is supercharged, and has for this purpose an exhaust turbocharger 36 which comprises a turbine 37 and a compressor 38. The turbine 37 is arranged in the exhaust system 34, whereas the compressor 38 is arranged in the fresh air system 32. A common shaft 39 connects a turbine impeller, not shown, of the turbine 37 to a compressor wheel, likewise not shown, of the compressor 38.

The internal combustion engine 28 is furthermore equipped with a low pressure exhaust gas recirculation line 40, which will be referred to below as "LP EGR line 40" and which forms a fluidic connection between the exhaust system 34 down-stream of the turbine 37 and the fresh air system 32 upstream of the compressor 38. The connection between the fresh air system 32 and the exhaust system 34 takes place with respect to the exhaust turbocharger 36 on the low pressure side. An exhaust gas recirculation valve 41, which will also be referred to below as EGR valve 41, is arranged in the LP EGR line 40. Further, optionally an exhaust gas recirculation cooler 42, which may also be referred to below as EGR cooler 42, may be arranged in the LP EGR line 40.

Gas exchange valves, namely intake valves 43 and exhaust valves 44, are provided for controlling the gas exchange operations of the cylinders 30. In this case, at least one intake valve 43 and at least one exhaust valve 44 is associated with each cylinder 30. Further, a valve gear 45 for actuating the gas exchange valves 43, 44 is provided. The valve gear 45 may have, for the intake valves 43, an intake camshaft 46 with intake cams 47 which actuate the intake valves 43. For controlling the exhaust valves 44, the valve gear 45 may have an exhaust camshaft 48 which bears exhaust cams 49 which actuate the exhaust valves 44.

Furthermore, a control means 50 may be provided which is connected in suitable manner for example to the EGR valve 41. Furthermore, the control means 50 may be connected to adjustment means 51 with which the valve gear 45 can be adjusted, for example in order to vary the opening times and/or closure times of the intake valves 43 and/or the exhaust valves 44.

In order to change the internal EGR rate 26, the control means 50 may cooperate with the adjustment members 51. In this case, the internal EGR rate 26 may preferably be carried out [sic] corresponding to the variants explained in greater detail with reference to FIGS. 1 and 2.

In order to change the external EGR rate 25, the control means 50 may control the EGR valve 41 accordingly.

In the example of FIG. 4, at least one catalyst 52 is arranged in the exhaust system 34. Further, a throttle valve 53 is arranged in the fresh air system 32, which valve can likewise be connected to the control means 50 for actuation.

What is claimed is:

1. A method for operating a supercharged internal combustion engine of a motor vehicle, comprising the steps of:
   while operating the supercharged internal combustion engine in lean burn in a predetermined range of low engine load and/or speed, operating an internal exhaust gas recirculation via at least one of controlling at least one intake valve (43) and controlling at least one exhaust valve (44) of a respective cylinder (30) of the supercharged internal combustion engine and operating an external exhaust gas recirculation via controlling an exhaust gas recirculation valve (41);
   with increasing engine load and/or speed of the supercharged internal combustion engine within the predetermined range of low engine load and/or speed, increasing an exhaust gas recirculation rate of the external exhaust gas recirculation and, at the same time, decreasing an exhaust gas recirculation rate of the internal exhaust gas recirculation, while reducing an overall exhaust gas recirculation rate wherein the overall exhaust gas recirculation rate is a sum of the exhaust gas recirculation rates of the external exhaust gas recirculation and the internal exhaust gas recirculation; and
   upon reaching an engine load and/or speed that exceeds the predetermined range of low engine load and/or speed, operating the supercharged internal combustion engine with a homogeneous mixture of air and fuel without exhaust gas recirculation.

2. The method as claimed in claim 1, wherein the exhaust gas recirculation rate of the external exhaust gas recirculation is set actively by the exhaust gas recirculation valve (41), and the exhaust gas recirculation rate of the internal exhaust gas recirculation is set passively by dynamics of gas exchange operations within the respective cylinder of the supercharged internal combustion engine.

3. The method as claimed in claim 1, wherein
   the internal exhaust gas recirculation is carried out by at least one of an early opening of the at least one intake valve (43) of the respective cylinder (30) of the supercharged internal combustion engine (28) and late closing of the at least one exhaust valve (44) of the respective cylinder (30), and
   the external exhaust gas recirculation is carried out via a low pressure exhaust gas recirculation line (40) which fluidically connects an exhaust system (34) of the supercharged internal combustion engine (28) downstream of a turbine (37) of an exhaust gas turbocharger (36) to a fresh air system (32) of the supercharged internal combustion engine (28) upstream of a compressor (38) of the exhaust turbocharger (36).

4. A supercharged internal combustion engine, in particular of a motor vehicle, comprising:
- an exhaust system (34) for removing exhaust (35) from cylinders (30) of the supercharged internal combustion engine (28),
- a fresh air system (32) with an intake throttle valve (53) for controlling fresh air (33) to the cylinders (30),
- an exhaust turbocharger (36) having a turbine (37) which is arranged in the exhaust system (34) and a compressor (38) which is arranged in the fresh air supply system (32),
- a low pressure exhaust gas recirculation line (40) with an exhaust gas recirculation valve (41) fluidically connecting the exhaust system (34) downstream of the turbine (37) to the fresh air system (32) upstream of the compressor (38),
- intake and exhaust valves (43,44) for controlling gas exchange operations of the cylinders (30),
- a valve drive (45) for actuating the intake and exhaust valves (43,44), which valve drive is configured such that, at least during a stratified charge operation (23), internal exhaust gas recirculation is established by early opening of at least one intake valve (43) of the respective cylinders (30) and/or by late closing of at least one exhaust valve (44) of the respective cylinders (30), and the valve drive (45) having at least one camshaft (46,48) with a plurality of cams (47,49) for actuating the exhaust valves (44) and the intake valves (43), with a cam profile of a respective cams (47,49) being formed such that a valve stroke/crankshaft angle curve (6, 8, 12, 15) of a late closing exhaust valve (44) and/or of an early opening intake valve (43) has at least four points of inflection, and
- a controller (50) for controlling the operation of the valve drive (45) for actuating the intake and exhaust valves (43,44), the intake throttle valve (53) and the exhaust gas recirculation valve (41).

* * * * *